Patented Jan. 31, 1939

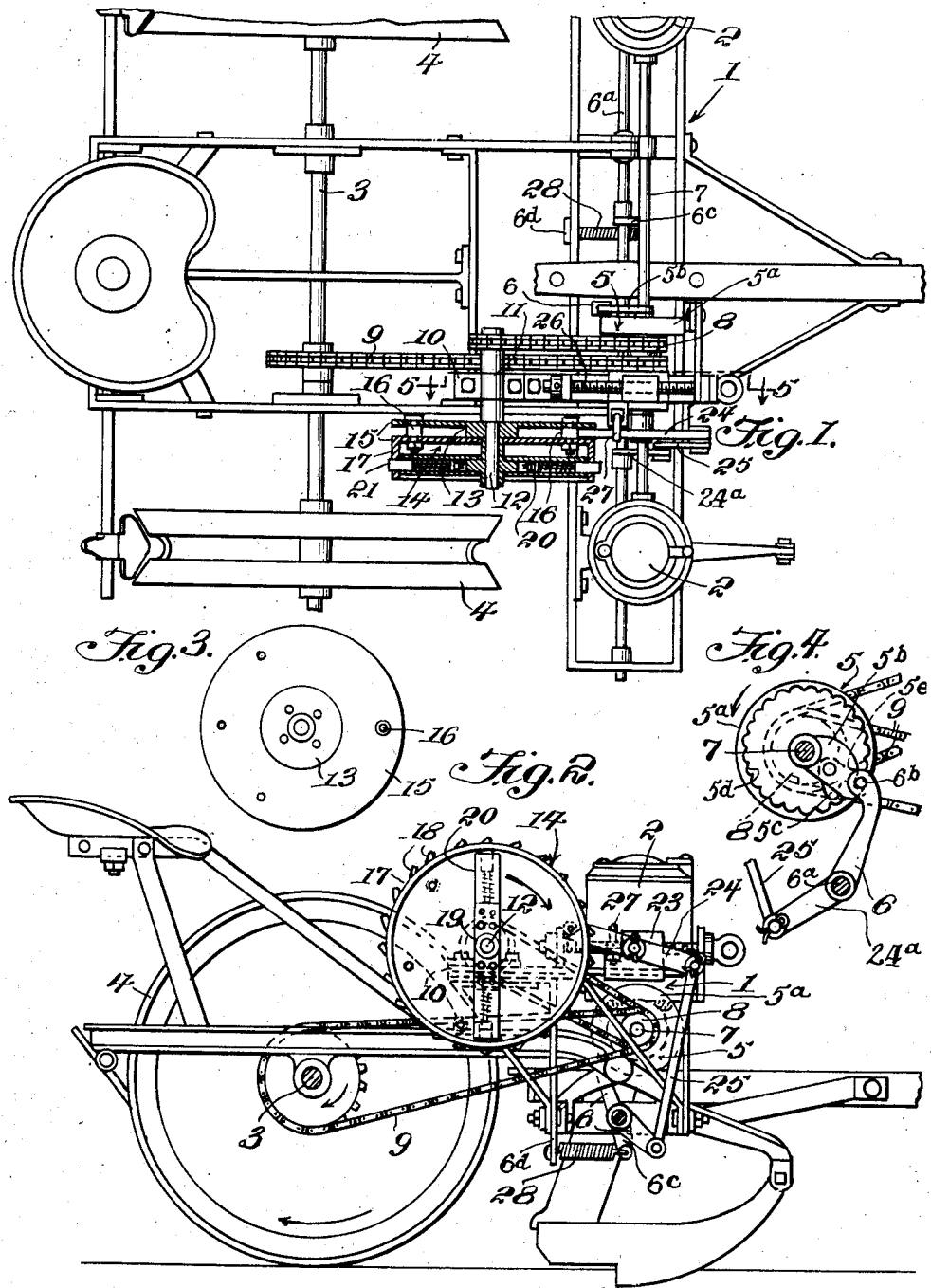

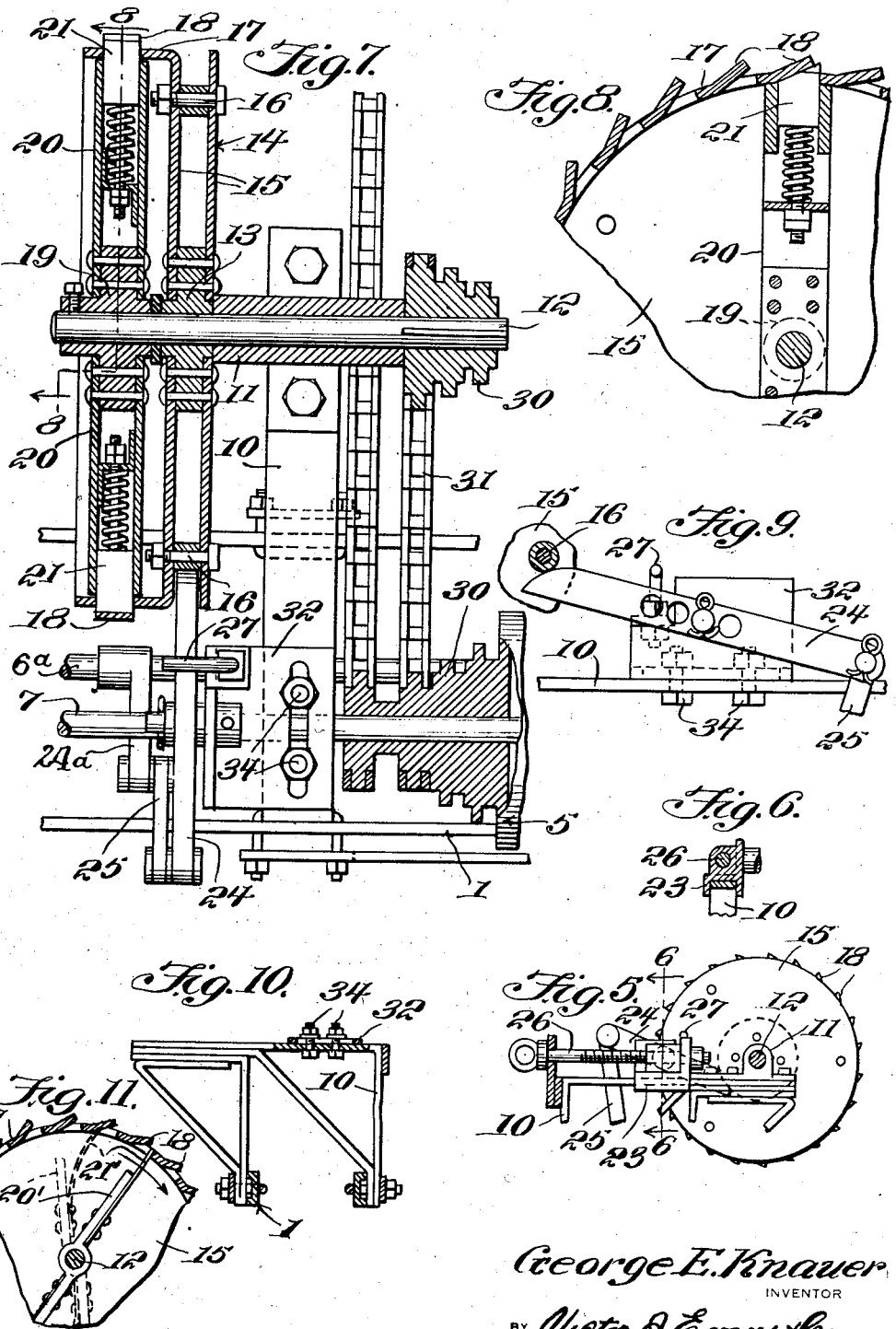

2,145,769

UNITED STATES PATENT OFFICE 2,145,769

SEED PLANTER DRIVING MECHANISM

George E. Knauer, Greencastle, Ind.

Application February 28, 1938, Serial No. 193,148

3 Claims. (Cl. 111—16)

This invention relates to a driving mechanism for the planting mechanism of a seed planter and has for the primary object the provision of a device of this character which will actuate the planting mechanism of a planter to plant seeds at a selected distance apart, commonly known as hill planting without the use of the usual check row wire and which may be readily adjusted to plant the seeds in hills at various selected distances apart and to match with seed plantings in a previously planted row.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view partly in section illustrating a planter equipped with a driving mechanism for the actuation of the planting mechanism of said planter and constructed in accordance with my invention.

Figure 2 is a fragmentary side elevation partly in section illustrating the same.

Figure 3 is a view illustrating timing means for the operation of the trip lever of the planting mechanism.

Figure 4 is a side elevation partly in section showing a conventional type of clutch used on planters for the control of the planting mechanism.

Figure 5 is a sectional view taken on the line 5—5 of Figure 1.

Figure 6 is a sectional view taken on the line 6—6 of Figure 5.

Figure 7 is a fragmentary transverse sectional view showing a modified form of my invention.

Figure 8 is a sectional view taken on the line 8—8 of Figure 7.

Figure 9 is a fragmentary side elevation illustrating the mounting of the trip lever used in the modified form of my invention.

Figure 10 is a front elevation partly in section illustrating a supporting bracket.

Figure 11 is a fragmentary vertical sectional view showing a modified form of ratchet means.

In practicing my invention, in the preferred embodiment illustrated in Figures 1 to 6 inclusive of the drawings, I provide a fragmentary portion of a planter 1 equipped with the usual planting mechanism 2 and an axle 3 on which are mounted a pair of ground wheels 4, the latter being fixed to the axle for effecting rotation thereof.

A clutch mechanism 5, operable by a trip arm 6, is mounted on the usual seed plate operating shaft 7 and serves to connect the shaft with a pair of sprocket gears 8, one of the latter being connected to a sprocket fixed on the axle 3 by means of a sprocket chain 9 whereby the gears 8 are continuously rotated during the operation of the wheels 4.

The clutch mechanism 5 comprises a drum 5a loosely mounted on the shaft 7 and has fixed thereto and rotatable therewith the gears 8. An arm 5b is fixed to the shaft 7, adjacent the drum 5a, and has pivoted thereto a spring pressed dog 5c adapted to engage teeth 5d formed on the inner periphery of the drum. The dog 5c is fashioned with an outwardly extending section 5e which, when the dog is in engagement with one of the teeth 5d, is disposed out of registry with one face of the arm 5b. When the dog is in engagement with one of the teeth 5d it serves to establish rotating connection between the drum 5a and shaft 7 for actuating the latter to bring about a seed dropping operation whereby planting of the seeds in hills a selected distance apart is obtained.

The lower end of the trip arm 6 is fixed to a trip shaft 6a and the upper end of said arm is provided with a laterally extending pin 6b for engagement with the outer end of the arm 5b and the section 5e of the dog. When the arm 6 is actuated by the trip shaft, as hereinafter more fully described, the pin 6b will engage the section 5e of the dog and cause registration thereof with the face of the arm 5b and actuate the dog 5c out of engagement with the teeth 5d, thus rendering the shaft 7 inoperative and permitting idle rotation of the drum 5a as clearly illustrated in Figure 4. Reverse movement of the arm 6, by the trip shaft 6a, serves to disengage the pin from the arm 5b and section 5e and permit engagement of the dog 5c with one of the teeth 5d to establish the aforementioned driving connection between the shaft 7 and sprocket gears 8.

Secured on the frame of the planter is a supporting bracket 10 equipped with a bearing 11 in which is rotatably mounted a shaft 12. The shaft 12 has fixed thereon a sprocket connected with the other of the gears 8 by means of a sprocket chain and said shaft has mounted thereon a hub 13 of a timing device or means 14 for actuating the trip shaft 6a and clutch mechanism 5.

The timing device comprises spaced disc-like plates 15 fixed to the hub 13 and each of said plates, adjacent the peripheries thereof, are provided with aligned openings through which extend a desired number of removable trip pins 16. A periphery of one of the plates 15 has integrally fashioned thereon a drum 17 formed with a series of ratchet teeth 18 which are struck outwardly therefrom. A hub 19 is mounted on the shaft 12 adjacent the hub 13 and has secured thereto oppositely extending dog carrying arms 20, the free ends of which terminate in proximity to the inner face of the drum 17. Spring pressed dogs 21 are carried by the arms 20 and engage the ratchet teeth 18 to establish a ratchet drive between the shaft 12 and the timing device 14.

A slide 23 is mounted on the bracket 10 and constitutes a pivot for a trip lever 24, one end of which is connected to an arm 24a fixed to the trip shaft 6a by a link 25. The other end of the trip lever 24 is disposed between the plates 15 for engagement with the pins 16 during the rotation of the timing device 14.

A feed stem 26 is threaded in the slide 23 and rotatably connected to the bracket 10 whereby the slide may be adjusted on the bracket 10 to vary the position of the pin engaging end of the trip lever 24 relative to the pins 16 and to adjust the free end of the trip lever in a manner to effect engagement with the hub 13 when it is desired to lock the clutch 5, this being desirable when using the planter in seeding soil in row formation as distinguished from hill formation.

A stop 27 is mounted on the slide 23 and overlies the trip lever 24 for limiting the pivotal movement of the latter in one direction. The trip shaft 6a is provided with a depending arm 6c and the frame of the planter is likewise provided with a depending arm 6d and connected to the lower ends of said arms is a spring 28 for normally urging the trip shaft 6a in a direction to maintain the trip lever 24 in engagement with the stop 27 whereby to position said trip lever for engagement with the pins 16.

It is to be understood that the clutch mechanism 5 acts to bring about the intermittent operation of the planting mechanism 2 and the control of the clutch mechanism is by the timing means 14 forming the subject matter of this invention.

In operation, the ground wheels continuously drive the timing means 14 when the planter is in motion and to bring about the timed operation of the clutch mechanism 5. The trip pins 16 engage with and impart to the trip lever pivotal movement for the actuation of said clutch mechanism thereby bringing about the hill planting of the seeds at a selected distance apart. The use of the timing means 14 eliminates the employment of the usual check row wire now commonly employed for the intermittent actuation of the clutch mechanism 5. By varying the number of trip pins 16 the distances between the hill planting of the seeds may be varied. The trip pins are removable from one set of openings to another in the timing means 14 thereby permitting a variance in the distances of the hill planting of the seeds. When it is desired to drill the seeds by the planter, the trip pins 16 are removed and the slide adjusted to bring the trip lever in engagement with the hub 13 securing the clutch mechanism 5 locked so that the seed plate shaft rotates continuously during the forward motion of the planter.

With the present invention in use on a planter and after the hill planting of the seeds of one row and the turning of the planter to plant a second row with the hills thereof matching the hills of the previous row the ratchet mechanism comes into use. The operator on starting the second row of planting may ratchet the timing mechanism so that the trip pins will be properly positioned to bring about the operation of the clutch mechanism 5 at a proper time for the hill planting of the seeds in the second row to match the hills of the previously planted row.

To vary the speed of rotation of the timing means 14 with that of the drive gear 8 my modified form of invention, as illustrated in Figures 7 and 8, may be employed wherein the shafts 12 and 7 are each equipped with different size sprocket gears 30 to receive the endless sprocket chain 31. By rearranging the sprocket chain 31 onto different gears 30 the shaft 12 may be rotated at different speeds from the shaft 7. Also in the modified form of my invention illustrated in Figures 9 and 10, a slide plate 32 may be used in lieu of the slide 23 and may be adjusted on the bracket 10 through the release of bolts 34 extending through a slot in the slide plate and carried by the bracket 10. The adjustment of the slide plate 32 is to vary the position of the trip lever with respect to the trip pins and the hub 13 of the timing means 14.

In the modified form illustrated in Figure 11, instead of employing the spring pressed dogs 21 and arms 20, the hub 19 may have rigid radially extending arms 20' fixed thereto which terminate short of the drum 17. Resilient fingers or dogs 21' are secured to the rigid arms 20' and project beyond the free ends of the latter to contact the ratchet teeth of the drum 17 and thereby establish a ratchet drive between the shaft 12 and the drum.

What is claimed is:

1. In combination with a planter having a planting mechanism including a clutch for the actuation of said planting mechanism from the planter drive and having a trip arm for the engagement and disengagement thereof, a trip lever pivotally and adjustably mounted on the planter and connected to said trip arm, and an adjustable timing means driven by the planter drive for a timed variable actuation of the trip lever.

2. In combination with a planter having a planting mechanism including a clutch for the actuation of said planting mechanism from the planter drive and having a trip arm for the engagement and disengagement thereof, a trip lever pivotally and adjustably mounted on the planter and connected to said trip arm, and a timing means mounted on the planter and driven by the planter drive and including removably and variably arranged trip pins for the actuation of the trip lever.

3. In combination with a planter having a planting mechanism including a clutch for the actuation of said planting mechanism from the planter drive and having a trip arm for the engagement and disengagement thereof, a trip lever pivotally and adjustably mounted on the planter and connected to said trip arm, and a timing means mounted on the planter and driven by the planter drive for the timed actuation of the trip lever and including a ratchet mechanism for adjusting said timing means in its actuation of the trip lever.

GEORGE E. KNAUER.